United States Patent [19]

Leman

[11] Patent Number: 5,008,794
[45] Date of Patent: Apr. 16, 1991

[54] REGULATED FLYBACK CONVERTER WITH SPIKE SUPPRESSING COUPLED INDUCTORS

[75] Inventor: Brooks R. Leman, Santa Clara, Calif.

[73] Assignee: Power Integrations, Inc., Mountain View, Calif.

[21] Appl. No.: 455,601

[22] Filed: Dec. 21, 1989

[51] Int. Cl.⁵ .......................................... H02M 3/335
[52] U.S. Cl. ........................................ 363/21; 363/56; 363/67
[58] Field of Search ................... 363/21, 47, 48, 67, 363/56

[56] References Cited

U.S. PATENT DOCUMENTS

| | | | |
|---|---|---|---|
| 1,712,677 | 5/1929 | Peter | 363/47 |
| 4,191,986 | 3/1980 | Huang et al. | 361/58 |
| 4,703,409 | 10/1987 | Spreen | 363/21 |

FOREIGN PATENT DOCUMENTS

| | | | |
|---|---|---|---|
| 1232249 | 1/1967 | Fed. Rep. of Germany | 363/47 |
| 68880 | 5/1980 | Japan | 363/21 |
| 144775 | 11/1980 | Japan | 363/21 |
| 74965 | 4/1985 | Japan | 363/21 |
| 157615 | 8/1985 | Japan | 363/21 |
| 52153 | 3/1986 | Japan . | |
| 207172 | 9/1986 | Japan . | |
| 303056 | 12/1989 | Japan . | |

*Primary Examiner*—William H. Beha, Jr.
*Attorney, Agent, or Firm*—Thomas E. Schatzel

[57] ABSTRACT

Flyback converters can generate multiple voltage levels by rectifying and filtering multiple windings on a single power transformer. Different voltages should be related by the turns ratio of the respective windings. Transformer leakage inductance causes leading edge voltage spikes on some windings causing the filters to peak charge to a higher value than expected. The addition of a small coupled inductor between two or more windings will block the leading edge spike allowing the filter to charge to the correct voltage. The turns ratio of the coupled inductor is selected to cancel the leading edge voltage spike on the desired winding. The coupled inductor can be used to correct the voltage of a winding used for feedback purposes as well as improving the cross regulation between multiple converter outputs.

5 Claims, 1 Drawing Sheet

REGULATED FLYBACK CONVERTER WITH SPIKE SUPPRESSING COUPLED INDUCTORS

BACKGROUND OF THE INVENTION

1. Field of the Invention

This invention relates to output regulation of an isolated power supply that uses a winding on a transformer for feedback. More specifically, it concerns a regulated flyback converter with spike suppressing coupling inductors.

2. Description of the Prior Art

A piece of electronic equipment requires a power supply unit that converts available power line voltage or battery voltage to voltage values required by the equipment. One class of power supply provides electrical isolation between the output and the input. This means there is no connection from the output of the power supply to the input. These "isolated" power supplies use a transformer as the isolation element.

Power supplies usually require regulation to control and maintain the voltage output within a specified range. A typical power supply for a computer application will have +5 volts +/−5% as an output specification. Meeting this specification requires that the power supply control the output voltage with some regulating device.

To meet the needs of both isolation and regulation, various approaches have been taken. Initially, a large transformer was connected directly to an alternating current (AC) source to step down the voltage. Then the voltage was converted to direct current (DC) with a rectifier and subsequently filtered. Regulation was provided by a device called a regulator which converts one DC voltage to another. This approach proved bulky (due to the size of the transformer for a typical 60 Hz source frequency) and did not directly address DC input applications. The regulator on the secondary side could be either a switching or linear regulator. The linear regulator drastically reduces the efficiency of the power supply.

Another approach is an isolated switching power supply that combines the efficiency of a switching regulator with the isolation of a transformer. This power supply creates AC (required to pass energy through the transformer) from a DC input. Higher frequencies (10 KHz or above) are used to reduce the size and weight of the transformer. The DC input can be obtained from an AC source with a simple rectifier and capacitor filter. Placing the transformer within the switching regulator itself tends to make regulation difficult and more costly. The complexity of the regulation scheme depends on the topology chosen for the switching regulator. Regulation requires that the output voltage is set at a specified level. The output voltage is adjusted until it matches a target or reference voltage. This is accomplished by using the well known negative feedback technique. The output is fed back and compared with a target voltage to generate an error voltage. The error voltage causes corrective action to be taken such that the error voltage is minimized. Power supplies that do not use feedback will have an output voltage that varies with the demands of the load.

The flyback topology is a low cost method for implementing isolated, switching power supplies. It includes an inherent isolation transformer that is a two winding inductor and does not require additional inductors. Energy is stored in the primary winding during the first portion of a switching cycle and released to the secondary winding during the second portion of the switching cycle. This topology has the added benefit of providing feedback information from the power transformer windings in the form of a voltage generated by transformer action during the second portion of the switching cycle.

During one switching cycle, a transistor connected to a transformer primary winding is turned on causing current to rise linearly, but no current flows through a secondary winding and a tertiary winding due to the blocking action of diodes in output circuits. The transformer is then turned off causing a voltage reversal on the primary winding (created by the magnetizing inductance of the primary). During this interval current flows through both the secondary and the tertiary windings delivering energy to the respective loads. The voltage on the tertiary is proportional to the secondary voltage by the turns ratio of the two windings (neglecting effects of leakage inductance). The tertiary output voltage can be used as a feedback voltage to regulate the output of the power supply as long as the leakage induced error terms can be neglected.

Transformer leakage inductance degrades the regulation of the flyback power supply by introducing voltage spikes into the transformer tertiary winding used for feedback. Secondary leakage inductance (parasitic series inductance inherent to any transformer winding) causes leading edge voltage spikes on the tertiary winding used for feedback. A tertiary filter will peak charge to the peak of the spike voltage (rather than the plateau) which introduces an initial error voltage into the feedback system. The peak voltage is proportional to the load current which means that the output voltage will vary greatly with changing load currents.

To solve the problem of voltage spikes in the feedback, one solution is to abandon tertiary winding sensing and close the feedback loop directly from the output voltage. Applications requiring isolation need a pulse transformer or opto-coupler to get the signal across the isolation boundary. Linear techniques can be used with optocouplers, but suffer from gain variations and are sensitive to noise. Modulation-demodulation schemes with either optocouplers or pulse transformers have less gain variation and are less sensitive to noise, but create additional circuit complexity and increased cost. Optocouplers can also cause reliability problems. Secondary sensing techniques usually require an error amplifier and voltage reference on the secondary side of the transformer and can experience difficulty during start up (initial turn on) of the power supply. This strategy results in an excessive number of parts which increases cost.

Another solution is to filter the spike out of the tertiary waveform. The time constant of a simple single pole filter can be used to eliminate the spike. However, feedback voltage itself is also filtered and such filtering of the feedback voltage slows down the response of the control loop leading to overshoot on the output or instability. The time constant of the filter determines the minimum amount of time the "plateau" feedback voltage must be present. This constraint requires a minimum load on the power supply or a reduction in power supply frequency to increase the plateau time relative to the width of the spike voltage. Load restrictions reduce the flexibility of the power supply while decreasing the switching frequency makes the power supply bigger.

Filters with higher complexity can be used to improve response and performance but add additional components and cost.

A third possible solution is to operate the power supply open loop with "Feed Forward" from the input voltage. The pulse width for the transistor switch controlling the output voltage can be determined analytically knowing the line voltage and load current. This approach is complex and suffers from accuracy problems over wide ranges of line voltage, load current and temperature.

A fourth approach involves "blanking" the spike. This requires a circuit with a transistor switch that is open during the spike and closed when the plateau feedback voltage is present. The algorithm for opening and closing the switch depends heavily on the load current since both the spike and the feedback voltages are affected. The analog switch action itself can also introduce voltage spikes. This "digital filtering" technique requires either a complex algorithm or a restricted load range to be accurate.

A fifth approach is the pure sample and hold technique used in digital signal processing. The waveform is sampled during the plateau portion. A widely varying load will shift the position of the plateau voltage and change the width. This technique also requires a complex algorithm or restricted load range to accurately sample the plateau feedback voltage.

SUMMARY OF THE PRESENT INVENTION

An object of the present invention is to improve output regulation of an isolated power supply that uses a winding on a power transformer for feedback.

Another object of the invention is to reduce voltage spikes in the feedback voltage caused by transformer leakage inductance.

A further object of the invention is to cause a tertiary filter to peak charge to the proper plateau voltage for yielding a more accurate feedback voltage.

A power supply transformer has a primary winding for power input, a first secondary winding for output, and a second secondary winding subject to voltage spikes cased by leakage inductance. A first inductor is connected in series with the first secondary winding so that current flowing from the first secondary winding passes through the first inductor. A second inductor is connected in series with the second secondary winding so that current flowing from the second secondary winding passes through the second inductor. The first and second inductors are coupled inductors wound on the same core with a turns ratio set so that voltage developed across the second inductor is slightly higher than the leading edge voltage spike to which the second secondary winding is subject.

Advantages of the invention include reduction of voltage spikes caused by leakage inductance in a transformer, improved load regulation of an isolated power supply that uses a winding on a power transformer for feedback, and a more accurate feedback voltage by causing a tertiary filter to peak charge to the proper plateau voltage.

These and other objects and advantages of the invention will no doubt become obvious to those of ordinary skill in the art after having read the following detailed description of the preferred embodiment which is illustrated in the various drawing figures.

IN THE DRAWINGS

DETAILED DESCRIPTION OF THE PREFERRED EMBODIMENTS

Figure 1:
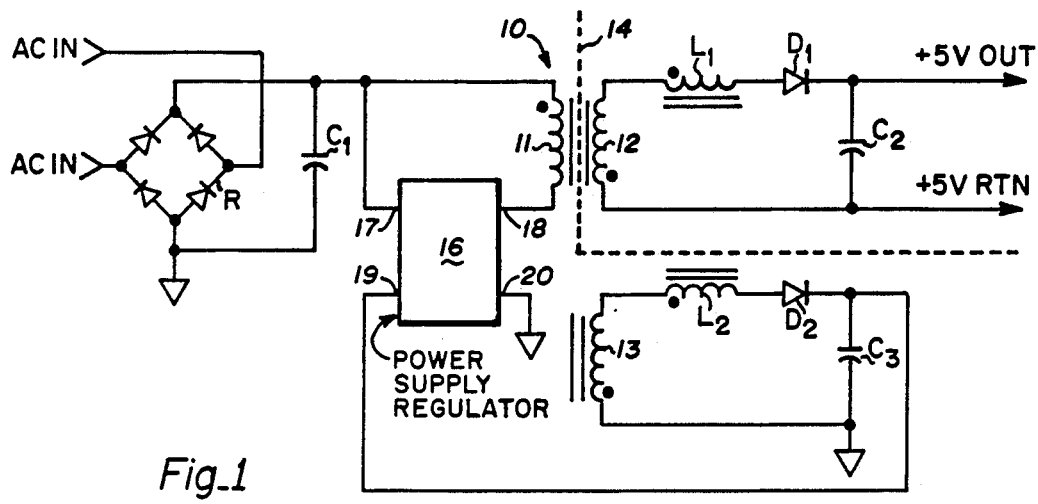
FIG. 1 is an electrical circuit diagram embodying the present invention.

With reference to FIG. 1, a power supply circuit is indicated by general reference numeral 10. A rectifier R and a capacitor $C_1$ convert voltage from an AC source to DC. This DC voltage is fed to a transformer primary winding 11. Positioned opposite the primary winding are transformer secondary winding 12 and transformer tertiary winding 13. An isolation boundary 14 separates the secondary winding from the primary and tertiary windings. A diode $D_1$ and a capacitor $C_2$ form a filter for the secondary winding output. A diode $D_2$ and a capacitor $C_3$ form a filter for the tertiary winding feedback. A first inductor $L_1$ is connected in series between the secondary winding 12 and diode $D_1$, while a second inductor $L_2$ is connected in series between the tertiary winding and diode $D_2$.

A switching power supply regulator 16 consisting of a controller and power transistor has an input connection 17 and a drain connection 18 to the opposite end of the transformer primary winding 11. This regulator also has a feedback connection 19 from the tertiary output of capacitor $C_3$ and a ground connection 20. The transistor inside the regulator controls current flow through the transformer primary winding. During one cycle of operation, when the transistor is turned on, current rises linearly, but no current flows through the secondary winding 12 and the tertiary winding 13 due to the blocking action of diodes $D_1$ and $D_2$. Then the transistor is turned off, causing a voltage reversal on the primary winding created by its magnetizing inductance. During this interval, current flows through both the secondary winding and the tertiary winding delivering energy to the respective loads. The voltage on the tertiary winding is proportional to the voltage on the secondary winding by the turns ratio of the two windings (neglecting effects of leakage inductance).

Inductors $L_1$ and $L_2$ are coupled inductors wound on the same core and compensate for leakage inductance. Inductor $L_1$ provides an additional impedance and current flows from the secondary winding 12 to this inductor. A voltage drop is generated by current flowing through inductor $L_1$. The voltage developed across inductor $L_1$ generates a proportional voltage across inductor $L_2$ due to the transformer effect. The voltage across inductor $L_2$ is adjusted by varying the turns ratio between inductors $L_1$ and $L_2$. This voltage is set up to be slightly higher than the leading edge voltage spike caused by leakage inductance. Dot polarity causes the voltage across inductor $L_2$ to cancel the leading edge voltage spike.

Figure 2:
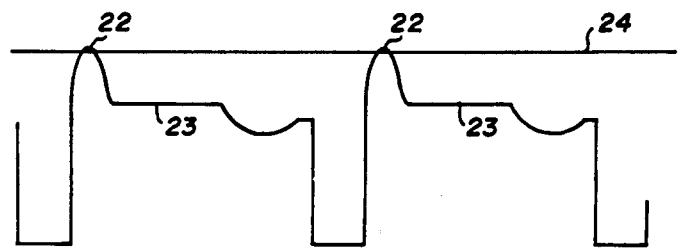
FIG. 2 is a waveform diagram of feedback voltage for an electrical circuit without the first and second inductors shown in FIG. 1.

With reference to FIG. 2, a waveform diagram of feedback voltage for a circuit without inductors $L_1$ and $L_2$ has leakage inductance spikes 22 followed by plateaus 23. A horizontal line 24 represents the voltage level at which capacitor $C_3$ peak charges and this level corresponds to the leakage inductance spikes.

Figure 3:
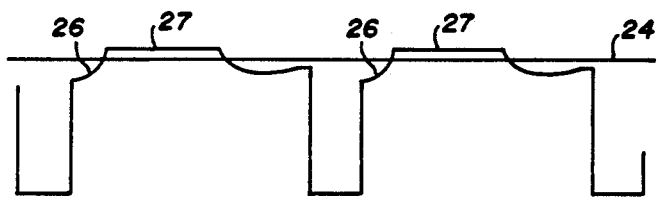
FIG. 3 is a waveform diagram of feedback voltage for the electrical circuit shown in FIG. 1.

Looking now at FIG. 3, a waveform diagram of feedback voltage for the circuit including inductors $L_1$ and $L_2$ has effective spike blocking at the leading edges 26 followed by plateaus 27. Horizontal line 24 represents the level which capacitor $C_3$ peak charges. FIG. 3 illustrates an undershoot where FIG. 2 illustrates an overshoot. Due to the action of inductors $L_1$ and $L_2$, capacitor $C_3$ now peak charges near the plateau voltage level yielding a more accurate feedback voltage.

The circuit has been tested with flyback converters operating in both continuous and discontinuous conduction mode and works well down to light loads ($+/-2.5\%$ regulation for 20% to 100% of load current).

This technique can also be used to improve the cross regulation of multi-output power supplies.

The power supply output regulation can also be used with a saturating transformer. The blocking voltage in this case decays to zero when the transformer saturates after the leading edge of the current waveform.

From the foregoing description, it will be seen that a power supply transformer has a primary winding 11 for power input, a secondary winding 12 for output, and a tertiary winding 13 subject to voltage spikes caused by leakage inductance. A first inductor $L_1$ is connected in series with the secondary winding 12 so that current flowing from the secondary winding passes through the inductor $L_1$. A second inductor $L_2$ is connected in series with the tertiary winding 13 so that current flowing from the tertiary winding passes through the inductor $L_2$. Inductors $L_1$ and $L_2$ are coupled inductors wound on the same core with a turns ratio set so that voltage developed across the second inductor $L_2$ is slightly higher than the leading edge voltage spike to which the tertiary winding 13 is subject. Dot polarity causes the voltage across inductor $L_2$ to cancel or block the leading edge voltage spike.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. In a flyback power supply that includes a transformer having a winding for power input, a first secondary winding for output, a first filter comprising a rectifier and a capacitor, a second secondary winding subject to voltage spikes caused by leakage inductance, and a second filter comprising a rectifier and a capacitor subject to peak charging to the leading edge of said voltage spikes, the improvement comprising:
   a first inductor connected in series with the first secondary winding so that current flowing from the first secondary winding passes through the first inductor,
   a second inductor connected in series with the second secondary winding so that current flowing from the second secondary winding passes through the second inductor, and
   said first and second inductors being coupled inductors wound on the same core with a turns ratio and dot polarity connection set so that voltage developed across the second inductor is slightly higher than the leading edge voltage spike to which the second secondary winding is subject for blocking current flow during the interval of the leading edge of the voltage waveform to cause said second filter to properly peak charge to the plateau of said voltage waveform.

2. In a flyback power supply that includes a transformer having a primary winding for power input, a secondary winding for output, a first filter comprising a rectifier and a capacitor, a tertiary winding for feedback subject to voltage spikes caused by the leakage inductance, and a second filter subject to peak charging to the leading edge of said voltage spikes, said transformer secondary winding being isolated from the transformer primary and tertiary windings, the improvement comprising:
   a first inductor connected in series with the secondary winding so that current flowing from the secondary winding passes through the first inductor,
   a second inductor connected in series with the tertiary winding so that current flowing from the tertiary winding passes through the second inductor,
   said first and second inductors being coupled inductors wound on the same core with a turns ratio set so that voltage developed across the second inductor is slightly higher than the leading edge voltage spike to which the tertiary winding is subject for blocking current flow during the interval of the leading edge of the voltage waveform, and
   whereby the leading edge voltage spike is cancelled due to dot polarity and the second filter peak charges to the proper plateau voltage yielding a more accurate feedback voltage.

3. The flyback power supply of claim 1 wherein said first and second secondary windings are for power output and said coupled first and second inductors improve the cross regulation thereof.

4. The flyback power supply of claim 2 wherein said tertiary filter includes a series diode and a shunt capacitor located on the opposite side of the second inductor from the tertiary winding, and further including a filter for the secondary winding output including a series diode and a shunt capacitor located on the opposite side of the first inductor from the secondary winding.

5. A regulated flyback converter comprising a primary winding for power input, a secondary winding for output, a first filter comprising a rectifier and a capacitor, a tertiary winding for feedback subject to voltage spikes caused by leakage, a second filter subject to peak charging to the leading edge of said voltage spikes, said secondary winding being isolated from the primary and the tertiary winding, a first inductor connected in series directly with the secondary winding so that current flowing from the secondary winding passes through the first inductor, a second inductor connected in series directly with said tertiary winding, said first and second inductors being coupled inductors wound on the same core with a turns ratio and dot polarity connection set so that voltage developed across the second inductor is slightly higher than the leading edge voltage spike to which the tertiary winding is subject for blocking current flow during the leading edge interval of the voltage waveform to cause said second filter to properly peak charge to the plateau of said voltage waveform.

* * * * *